(12) United States Patent
Lambert et al.

(10) Patent No.: US 8,321,616 B2
(45) Date of Patent: Nov. 27, 2012

(54) SYSTEM AND METHOD FOR ENABLING INTERCHANGEABLE DEDICATED MANAGEMENT NETWORK INTERFACE CARD ACCESS VIA FABRIC CONTROLLER

(75) Inventors: Timothy M. Lambert, Austin, TX (US); Shawn Joel Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 12/540,147

(22) Filed: Aug. 12, 2009

(65) Prior Publication Data

US 2011/0040917 A1 Feb. 17, 2011

(51) Int. Cl.
*G06F 13/00* (2006.01)
(52) U.S. Cl. ......................... 710/301; 710/305
(58) Field of Classification Search .......... 710/301–306, 710/100; 370/389, 392
See application file for complete search history.

(56) References Cited

U.S. PATENT DOCUMENTS

| | | | |
|---|---|---|---|
| 7,533,204 B2 * | 5/2009 | Zimmerman et al. | 710/104 |
| 2006/0280195 A1 * | 12/2006 | Lopez et al. | 370/419 |
| 2008/0080496 A1 * | 4/2008 | Slaight | 370/389 |
| 2009/0164690 A1 * | 6/2009 | Slaight | 710/306 |

* cited by examiner

*Primary Examiner* — Brian Misiura
*Assistant Examiner* — Kim Huynh
(74) *Attorney, Agent, or Firm* — Baker Botts L.L.P.

(57) ABSTRACT

Systems and methods for reducing problems and disadvantages associated with traditional approaches to providing dedicated network interface card access are provided. An information handling system may include a processor, a memory communicatively coupled to the processor, a non-dedicated network interface communicatively coupled to the processor, a dedicated network interface, and a baseboard management controller. The non-dedicated network interface may have a first sideband interface. The dedicated network interface may have a second sideband interface communicatively coupled to the first sideband interface. The baseboard management controller may be communicatively coupled to the second sideband interface.

19 Claims, 2 Drawing Sheets

SYSTEM AND METHOD FOR ENABLING INTERCHANGEABLE DEDICATED MANAGEMENT NETWORK INTERFACE CARD ACCESS VIA FABRIC CONTROLLER

TECHNICAL FIELD

The present disclosure relates in general to information handling systems, and more particularly to providing interchangeable dedicated management network interface card access via a fabric controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Traditionally, some information handling systems utilize each of a dedicated network interface card (NIC) and at least one non-dedicated NIC. A dedicated NIC is often used as an interface between an information handling system, which includes the dedicated NIC, and a management network by which an administrator may direct management traffic to a baseboard management controller or similar system via an "out-of-band" communications channel that is isolated from the "in-band" communications channel for which network traffic other than management traffic may be communicated (e.g., via the non-dedicated NIC). However, because isolation of management traffice from non-management traffic often requires additional cabling and network router ports, administrators may often shooce to operate information handling systems in a "shared NIC mode" by which the non-dedicated NIC may communicate both management and non-management traffic.

However, regardless of whether a dedicated NIC mode or shared NIC mode is selected by an administrator, traditional approaches for supporting both have disadvantages. For example, a baseboard management controller (BMC) in a traditional information handling system supporting both modes may require two media access controllers (MACs), as dedicated NICs and non-dedicated NICs may utilize different standards or protocols to communicate with the BMC (e.g., the dedicated NIC may utilize Reduced Media Independent Interface (RMII) to communicate with the BMC and the non-dedicated NIC may utilize Network Controller Sideband Interface (NC-SI) to communicate with the BMC, each of which cannot be electrically or logically shared). Also, using traditional approaches, a Management Data Input-Output/Management Data Clock (MDIO/MDC) bus is also required between the dedicated NIC and the BMC. Moreover, the dedicated NIC may include a PHY that may consume power regardless of whether dedicated NIC mode or shared NIC mode is selected.

SUMMARY

In accordance with the teachings of the present disclosure, the disadvantages and problems associated with providing dedicated NIC access have been reduced or eliminated.

In accordance with an embodiment of the present disclosure, an information handling system may include a processor, a memory communicatively coupled to the processor, a non-dedicated network interface communicatively coupled to the processor, a dedicated network interface, and a baseboard management controller. The non-dedicated network interface may have a first sideband interface. The dedicated network interface may have a second sideband interface communicatively coupled to the first sideband interface. The baseboard management controller may be communicatively coupled to the second sideband interface.

In accordance with another embodiment of the present disclosure, a network interface device may include a sideband interface configured to communicatively couple to a baseboard management controller, a PHY configured to communicatively couple to a network, and a media access control filter interfaced between the PHY and the second sideband interface. The media access device may be configured to filter communications such that management data received by the media access control filter is forwarded while non-management data received by the media access control filter is not forwarded.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
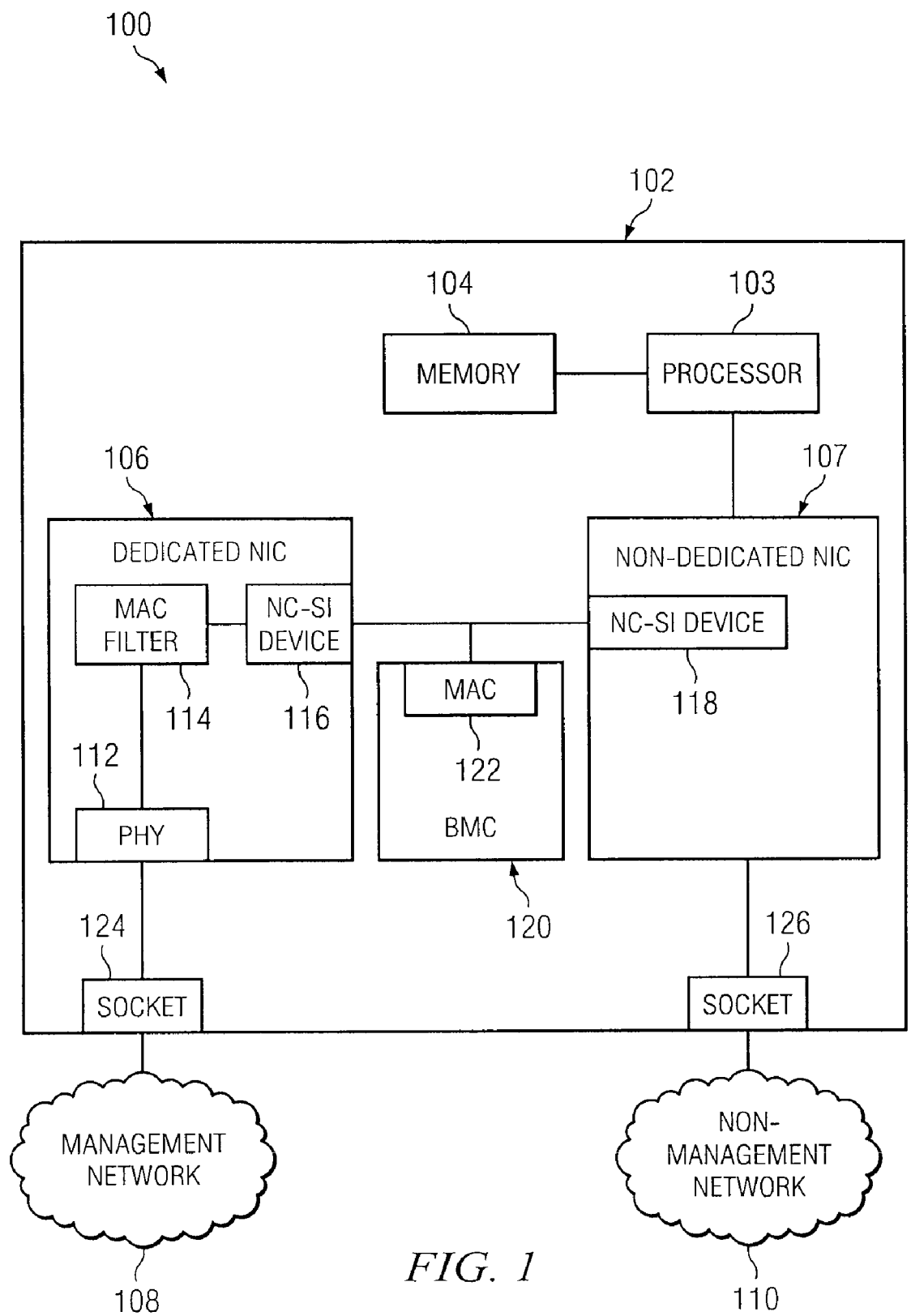
FIG. 1 illustrates a block diagram of an example system for providing dedicated NIC access, in accordance with certain embodiments of the present disclosure.
Figure 2:
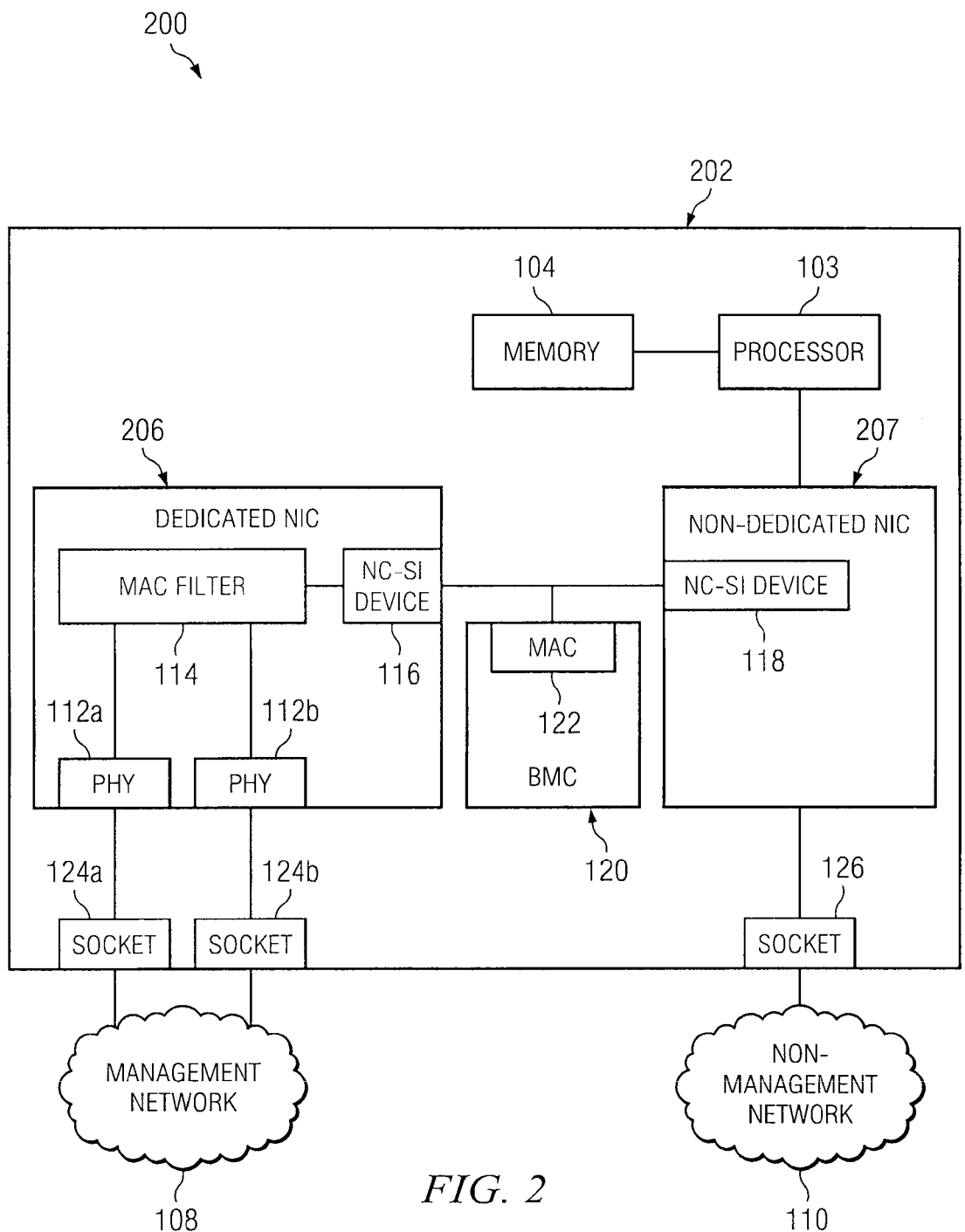
FIG. 2 illustrates a block diagram of another example system for providing dedicated NIC access, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100 for providing dedicated NIC access, in accordance with certain embodiments of the present disclosure. As depicted in FIG. 1, system 100 may include an information handling system 102, a management network 108, and a non-management network 110. Management network 108 and non-management network may each individually be referred to as "network 108" or "network 110," and may collectively be referred to as "networks 108, 110."

Information handling system 102 may generally be operable to receive data from and/or communicate data to one or more other information handling systems via one or both of networks 108, 110. In certain embodiments, information handling system 102 may be a server. In another embodiment, information handling system 102 may be a personal computer (e.g., a desktop computer or a portable computer). As depicted in FIG. 1, information handling system 102 may include a processor 103, a memory 104 communicatively coupled to processor 103, a non-dedicated network interface card (NIC) 107 communicatively coupled to processor 103, a dedicated NIC 106 communicatively coupled to non-dedicated NIC 107, a baseboard management controller (BMC) 120 communicatively coupled to each of dedicated NIC 106 and non-dedicated NIC 107, a socket 124 communicatively coupled to dedicated NIC 106, and a socket 126 communicatively coupled to non-dedicated NIC 107.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Dedicated NIC 106 may include any suitable system, apparatus, or device operable to serve as an interface between information handling system 102 and management network 108. Dedicated NIC 106 may enable information handling system 102 to communicate over management network 108 using any suitable transmission protocol and/or standard, including without limitation all transmission protocols and/or standards enumerated below with respect to the discussion of management network 108. In certain embodiments, dedicated NIC 106 may include or be an integral part of an access controller that may permit an administrator or other person to remotely monitor and/or remotely manage information handling system 102 (e.g., via an information handling system remotely connected to information handling system 102 via management network 108) regardless of whether information handling system 102 is powered on and/or has an operating system installed thereon. Accordingly, such access controller may allow for "out-of-band" control of information handling system 102, such that communications to and from dedicated NIC 106 are communicated via a management channel physically isolated from the "in-band" communication between non-management network 110 and non-dedicated NIC 107. In these embodiments (i.e., embodiments where dedicated NIC 106 may include or be an integral part of an access controller), dedicated NIC 106 may include or may be an integral part of a Dell Remote Access Controller (DRAC) or an Integrated Dell Remote Access Controller (iDRAC). In addition, in such embodiments, such access controller may allow an administrator to remotely manage one or more parameters associated with operation of information handling system 102 (e.g., power usage, processor allocation, memory allocation, security privileges, etc.).

In certain embodiments, dedicated NIC 106 may be removable and/or interchangeable with one or more dedicated NICs 106 that may or may not be similar to dedicated NIC 106 depicted in FIG. 1. As an example, a particular dedicated NIC 106 may be adapted for communication in accordance with the Gigabit Ethernet (GigE) standard, and may be removable interchangeable with one or more other removable and/or interchangeable dedicated NICs 106 that may be adapted for communication in accordance with other communications standards, such as 10 Gigabit Ethernet (10 GigE) or FibreChannel (FC) standards, for example.

As shown in FIG. 1, dedicated NIC 106 may include a PHY 112, a MAC filter 114 communicatively coupled to PHY 112, and a Network Controller Sideband Interface (NC-SI) device 116 communicatively coupled to MAC filter 114. PHY 112 may include any system, device, or apparatus configured to communicatively couple a link layer device (e.g., a media access controller or a MAC filter) to a physical medium (e.g., an optical fiber or copper cable coupled to socket 124).

MAC filter 114 may include any system, device, or apparatus configured to filter communications such that management data is further communicated while non-management data is not further communicated. For example, MAC filter 114 may filter data received from PHY 112 such that management data is further communicated to NC-SI device 116, while non-management data is not further communicated to NC-SI device 116. As another example, MAC filter 114 may filter data received from NC-SI device 116 such that management data is further communicated to PHY 112, while non-management data is not further communicated to PHY 112.

MAC filter 114 may utilize any suitable filtering technique, including without limitation layer 2 address filtering.

NC-SI device 116 may include any system, device, or apparatus configured to communicatively couple dedicated NIC 106 to BMC 120 in accordance with the NC-SI Specification.

Non-dedicated NIC 107 may include any suitable system, apparatus, or device operable to serve as an interface between information handling system 102 and non-management network 110. Non-dedicated NIC 107 may enable information handling system 102 to communicate over non-management network 110 using any suitable transmission protocol and/or standard, including without limitation all transmission protocols and/or standards enumerated below with respect to the discussion of non-management network 110. In certain embodiments, non-dedicated NIC 107 may include or be an integral part of a LAN on motherboard (LOM), wherein network interface hardware of non-dedicated NIC 107 is an integral part of a motherboard of information handling system 102. In other embodiments, non-dedicated NIC 107 may include or be an integral part of a host bus adapter (HBA). Although a LOM and an HBA have been identified as examples of non-dedicated NIC 107, non-dedicated NIC 107 is not limited to those examples, and may include any suitable device, system, or apparatus. In certain embodiments, non-dedicated NIC 107 may be configurable to allow operation in either of a "shared" mode or "unshared" mode. In the shared mode, both management communications and non-management communications for information handling system 102 may be communicated to and from non-dedicated NIC 107. In the unshared mode, non-management communications for information handling system 102 may be communicated to and from non-dedicated NIC 107 while management communications are communicated to and from dedicated NIC 106 in an "out-of-band" channel isolated from the "in-band" channel used for non-management communications.

As depicted in FIG. 1, non-dedicated NIC 107 may include NC-SI device 118. NC-SI device 118 may include any system, device, or apparatus configured to communicatively couple dedicated NIC 106 to non-dedicated NIC 107 in accordance with the NC-SI Specification.

BMC 120 may be any suitable system, device or apparatus configured to manage the interface between system management software and platform hardware using any suitable protocol and/or standard, including, without limitation, the Intelligent Platform Management Interface (IPMI) architecture. BMC 120 may interface with different types of sensors built into information handling system 102 or its components and may report to BMC 120 regarding parameters such as temperature, cooling fan speeds, power mode, operating system (OS) status, etc. Accordingly, BMC 120 may monitor the sensors and may communicate alerts to a system administrator via management network 108 (in dedicated NIC mode) or via network 110 (in shared NIC mode) or other means if any of the parameters associated with the sensors vary from preset limits or thresholds, indicating a potential failure of information handling system 102 or one or more of its various components. The administrator may also remotely communicate with BMC 120 to take corrective action such as, for example, resetting or power cycling information handling system 102 or one or more of its components (e.g., to cause a stalled operating system to run again).

As depicted in FIG. 1, BMC 120 may include media access controller (MAC) 122. MAC 122 may be any suitable device, system or apparatus configured to provide addressing and/or channel access control mechanisms to allow BMC 120 to communicate with management network 108, non-management network 110, or other multipoint network.

Socket 124 may be any suitable modular connector for coupling management network 108 to dedicated NIC 106 (e.g., an 8P8C or RJ45 socket). Similarly, socket 126 may be any suitable modular connector for coupling non-management network 110 to non-dedicated NIC 107 (e.g., an 8P8C or RJ45 socket).

Each of networks 108, 110 may be a network and/or fabric configured to communicatively couple information handling system 102, other information handling systems, and/or other networked components to each other. Each of networks 108, 110 may include a communication infrastructure, which provides physical connections, and a management layer, which organizes the physical connections and information handling system 102. In the same or alternative embodiments, each of networks 108, 110 may allow block I/O services and/or file access services to network-attached computer-readable media.

Each of networks 108, 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Each of management network 108, 110 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Each of management network 108, 110 and its various components may be implemented using hardware, software, or any combination thereof. Although depicted as separate networks in FIG. 1, network 108 and network 110 may, in certain embodiments, comprise the same network.

In operation, information handling system 102 may be configured in a dedicated NIC mode or a shared NIC mode. In the dedicated NIC mode, dedicated NIC 106 may serve as an interface between BMC 120 and management network 108 such that out-of-band management communications may be isolated from the in-band non-management communications between non-dedicated NIC 107 and non-management network 110. In a shared NIC mode, non-dedicated NIC 107 may serve as an interface between BMC 120 and non-management network 110 as well as an interface between other components of information handling system 102 and non-management network 110, such that both management and non-management communications are not isolated from and each other and may be communicated to and from non-dedicated NIC 107.

FIG. 2 illustrates a block diagram of another example system 200 for providing dedicated NIC access, in accordance with certain embodiments of the present disclosure. As depicted in FIG. 2, system 200 may include an information handling system 202, a management network 108, and a non-management network 110. Management network 108 may be identical or similar to management network 108 of FIG. 1, and non-management network 110 may be identical or similar to non-management network 110 of FIG. 1.

In addition, information handling system 202 may be identical or similar to that of information handling system 102 of FIG. 1, except that information handling system 202 may include dedicated NIC 206 in lieu of dedicated NIC 106, and may include an additional socket 124.

Similar to dedicated NIC 106, dedicated NIC 206 may include any suitable system, apparatus, or device operable to serve as an interface between information handling system 202 and management network 108. Dedicated NIC 206 may enable information handling system 202 to communicate over management network 108 using any suitable transmission protocol and/or standard, including without limitation all transmission protocols and/or standards enumerated above with respect to the discussion of management network 108. In certain embodiments, dedicated NIC 206 may include or be an integral part of an access controller that may permit an administrator or other person to remotely monitor and/or remotely manage information handling system 202 (e.g., via an information handling system remotely connected to information handling system 202 via management network 108) regardless of whether information handling system 202 is powered on and/or has an operating system installed thereon. Accordingly, such access controller may allow for "out-of-band" control of information handling system 202, such that communications to and from dedicated NIC 206 are communicated via a management channel physically isolated from the "in-band" communication between non-management network 110 and non-dedicated NIC 107. In these embodiments (i.e., embodiments where dedicated NIC 206 may include or be an integral part of an access controller), dedicated NIC 206 may include or may be an integral part of a Dell Remote Access Controller (DRAC) or an Integrated Dell Remote Access Controller (iDRAC). In addition, in such embodiments, such access controller may allow an administrator to remotely manage one or more parameters associated with operation of information handling system 202 (e.g., power usage, processor allocation, memory allocation, security privileges, etc.).

In certain embodiments, dedicated NIC 206 may be removable and/or interchangeable with one or more dedicated NICs 206 that may or may not be similar to dedicated NIC 206 depicted in FIG. 2 or dedicated NIC 106 depicted in FIG. 1. As an example, a particular dedicated NIC 206 may be adapted for communication in accordance with the Gigabit Ethernet (GigE) standard, and may be removable interchangeable with one or more other removable and/or interchangeable dedicated NICs 206 that may be adapted for communication in accordance with other communications standards, such as 10 Gigabit Ethernet (10 GigE) or FibreChannel (FC) standards, for example.

As shown in FIG. 2, dedicated NIC 206 may include two or more PHYs 112, a MAC filter 114 communicatively coupled to each PHY 112, and an NC-SI device 116 communicatively coupled to MAC filter 114. Each PHY 112 may be similar or identical to PHY 112 depicted in FIG. 1. MAC filter 114 may be similar or identical to MAC filter 114 depicted in FIG. 1. NC-SI device 116 may be similar or identical to NC-SI device 116 depicted in FIG. 1.

Using the methods and systems disclosed herein, problems associated with conventional approaches to providing dedicated NIC access in an information handling system may be improved, reduced, or eliminated. For instance, a dedicated NIC may provide support for management via communications standards that might not otherwise be supported by the particular BMC of the information handling system. As an example, a dedicated NIC using the Gigabit Ethernet standard may be used in an information handling system in which the MAC of the BMC supports a different standard, such as 100 Mbps Ethernet. Accordingly, this particular example would permit full Gigabit Ethernet support within the dedicated NIC without requiring a Gigabit Ethernet MAC in the BMC.

Furthermore, the dedicated NIC's sideband MAC filtering may limit throughput to that supported by the BMC (e.g., 100 Mbps), thus permitting use of existing BMCs with a communication standard different than that of the dedicated NIC. MAC filtering may also include programmable broadcast storm suppression which may reduce the likelihood of storms overpowering the BMC, as compared to traditional approaches.

Additionally, the systems and methods described herein permit operability with a BMC having only one MAC with multi-drop connectivity, thus permitting the use of BMCs with lower hardware complexity, and thus, lower cost.

Moreover, techniques such as "Wake-on-LAN" may be supportable through the dedicated NIC, allowing a packet (e.g., a "magic packet") to be used on the management network to wake the BMC from a lower power or auxiliary state to full operation and/or easily wake the information handling system without requirement commands supported by IPMI or similar standards.

In addition, no MDIO/MDC bus may be required for configuration as NC-SI or similar sideband standards may not require such a bus, thus reducing hardware complexity.

Further, the use of multiple-port dedicated NIC (e.g., dedicate NIC 206) may increase availability over traditional approaches as it may allow failover and teaming on dedicated management network connections. The systems and methods described herein also allow an administrator to bind dedicated and non-dedicated NICS together for both link failover and traffic teaming support. Accordingly, management port stacking synonymous with that used in chassis management controllers may be enabled.

Also, the methods and systems described herein allow for the use of interchangeable management networks or fabrics, as dedicated NICs (e.g., dedicated NIC 106 and/or dedicated NIC 206) may be removable and/or interchangeable. Consequently, numerous usage models are enabled (e.g., a FibeeChannel management domain, iSCSI access to storage area networks) including the use of combinations of controllers.

Although the present disclosure has been described in detail, it should be understood that various changes, substitutions, and alterations can be made hereto without departing from the spirit and the scope of the disclosure as defined by the appended claims.

What is claimed is:

1. An information handling system, comprising:
 a processor;
 a memory communicatively coupled to the processor;
 a non-dedicated network interface communicatively coupled to the processor, the non-dedicated network interface having a first sideband interface;
 a dedicated network interface having a second sideband interface communicatively coupled to the first sideband interface the dedicated network interface further including:
  a PHY configured to communicatively couple to a network;
  a media access control filter interfaced between the PHY and the second sideband interface and configured to filter communications using address filtering such that management data received by the media access control filter is forwarded while non-management data received by the media access control filter is not forwarded; and a baseboard management controller communicatively coupled to the second sideband interface.

2. An information handling system according to claim 1, the dedicated network interface further including a second PHY communicatively coupled to the media access control filter and configured to communicatively couple to the network.

3. An information handling system according to claim 1, the baseboard management controller including a media access controller communicatively coupled to the first sideband interface and the second sideband interface.

4. An information handling system according to claim 3, wherein the media access controller supports a first communication standard different from a second communication standard supported by the PHY.

5. An information handling system according to claim 4, wherein the first communication standard is 100 Mbps Ethernet and the second communication standard is Gigabit Ethernet.

6. An information handling system according to claim 3, wherein the baseboard management controller includes only one media access controller.

7. An information handling system according to claim 1, wherein the dedicated network interface controller includes or is an integral part of an access controller.

8. An information handling system according to claim 1, wherein:

the PHY supports a first communication standard, and the dedicated network interface controller is interchangeable with a second dedicated interface controller including a PHY that supports a second communication standard.

9. An information handling system according to claim 1, wherein the non-dedicated network interface controller includes or is an integral part of one of a LAN on motherboard and a host bus adapter.

10. An information handling system according to claim 1, the dedicated network interface configured to communicate management traffic between the baseboard management controller and a network in an out-of-band channel isolated from an in-band channel whereby non-management traffic is communicated between the non-dedicated network interface card and the network.

11. An information handling system according to claim 1, wherein at least one of the first sideband interface and the second sideband interface includes a Network Controller Sideband Interface.

12. A network interface device, comprising:

a sideband interface configured to communicatively couple to a baseboard management controller;

a PHY configured to communicatively couple to a network; and a media access control filter interfaced between the PHY and the sideband interface and configured to filter communications using address filtering such that management data received by the media access control filter is forwarded while non-management data received by the media access control filter is not forwarded.

13. A network interface device according to claim 12, the dedicated network interface further including a second PHY communicatively coupled to the media access control filter and configured to communicatively couple to the network.

14. A network interface device according to claim 12, wherein the PHY supports a first communication standard different from a second communication standard supported by the baseboard management controller.

15. A network interface device according to claim 14, wherein the first communication standard is Gigabit Ethernet and the second communication standard is 100 Mbps Ethernet.

16. A network interface device according to claim 12, wherein the dedicated network interface controller includes or is an integral part of an access controller.

17. A network interface according to claim 12, wherein the sideband interface includes a Network Controller Sideband Interface.

18. A network interface according to claim 12, wherein the sideband interface further configured to couple to a second sideband interface of a non-dedicated network interface.

19. A network interface according to claim 18, further configured to communicate management traffic between the baseboard management controller and a network in an out-of-band channel isolated from an in-band channel whereby non-management traffic is communicated between the non-dedicated network interface card and the network.

* * * * *